(12) United States Patent
Braillard et al.

(10) Patent No.: US 9,985,304 B2
(45) Date of Patent: May 29, 2018

(54) METHOD FOR SHUTTING DOWN A SYSTEM CONTAINING A FUEL CELL STACK AND SYSTEM COMPRISING A FUEL CELL STACK

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Vincent Braillard, Clermont-Ferrand (FR); Gino Paganelli, Clermont-Ferrand (FR); Antonio Delfino, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 81 days.

(21) Appl. No.: 14/902,499

(22) PCT Filed: Jun. 30, 2014

(86) PCT No.: PCT/EP2014/063795
§ 371 (c)(1),
(2) Date: Nov. 21, 2016

(87) PCT Pub. No.: WO2015/000824
PCT Pub. Date: Jan. 8, 2015

(65) Prior Publication Data
US 2017/0179507 A1 Jun. 22, 2017

(30) Foreign Application Priority Data
Jul. 4, 2013 (FR) ..................... 13 56560

(51) Int. Cl.
*H01M 8/16* (2006.01)
*H01M 8/04223* (2016.01)
(Continued)

(52) U.S. Cl.
CPC ... *H01M 8/04231* (2013.01); *H01M 8/04303* (2016.02); *H01M 8/04753* (2013.01); *H01M 8/04947* (2013.01); *H01M 2008/1095* (2013.01)

(58) Field of Classification Search
CPC .......................................... H01M 8/04
See application file for complete search history.

(56) References Cited

U.S. PATENT DOCUMENTS

2004/0101724 A1  5/2004  Imamura et al.
2005/0136297 A1  6/2005  Inai et al.
(Continued)

FOREIGN PATENT DOCUMENTS

FR     2 952 232      5/2011
JP     2003-109630    4/2003
(Continued)

*Primary Examiner* — Jacob Marks
(74) *Attorney, Agent, or Firm* — Cozen O'Connor

(57) ABSTRACT

The invention relates to a method for stopping a polymer electrolyte membrane fuel-cell stack and to a system containing a fuel-cell stack implementing such a method. The system comprises a gas circuit and a stack of electrochemical cells forming a fuel-cell stack comprising a polymer ion exchange membrane, said circuit comprising: a fuel-gas supply circuit (11) connecting a fuel-gas tank to the anode of the fuel-cell stack; and an oxidant-gas supply circuit (12*b*) connecting an oxidant-gas tank, or atmospheric air, to the cathode of the fuel-cell stack; characterized in that the system furthermore comprises means able to completely eliminate hydrogen present at the anode of the fuel-cell stack.

4 Claims, 2 Drawing Sheets

(51) Int. Cl.
*H01M 8/04303* (2016.01)
*H01M 8/04746* (2016.01)
*H01M 8/04828* (2016.01)
*H01M 8/1018* (2016.01)

(56) References Cited

U.S. PATENT DOCUMENTS

| | | |
|---|---|---|
| 2007/0087233 A1 | 4/2007 | Blaszczyk et al. |
| 2008/0075986 A1 | 3/2008 | Salvador et al. |
| 2008/0176127 A1* | 7/2008 | Rogahn ............. H01M 8/04231 429/429 |
| 2012/0077102 A1 | 3/2012 | Morita et al. |
| 2012/0308906 A1* | 12/2012 | Paganelli .......... H01M 8/04097 429/415 |

FOREIGN PATENT DOCUMENTS

| | | |
|---|---|---|
| JP | 2006-019123 | 1/2006 |
| JP | 2007-123013 | 5/2007 |
| KR | 2009 0111241 | 10/2009 |

* cited by examiner

METHOD FOR SHUTTING DOWN A SYSTEM CONTAINING A FUEL CELL STACK AND SYSTEM COMPRISING A FUEL CELL STACK

RELATED APPLICATIONS

This is a U.S. National Phase Application under 35 USC 371 of International Application PCT/EP2014/063795 filed on Jun. 30, 2014.

This application claims the priority of French application no. 13/56560 filed Jul. 4, 2013, the entire content of which is hereby incorporated by reference.

FIELD OF THE INVENTION

The present invention relates to fuel-cell stacks and in particular, but not exclusively, fuel-cell stacks in which the electrolyte takes the form of a polymer membrane (i.e. PEFCs (polymer electrolyte fuel cells) or PEMFCs (proton exchange membrane fuel cells)).

BACKGROUND OF THE INVENTION

It is known that fuel-cell stacks make it possible to produce electrical power directly, via an electrochemical redox reaction, from a fuel gas and an oxidant gas, without conversion into mechanical energy. This technology seems promising especially for automotive applications. A fuel-cell stack generally includes the association in series of unitary elements that each essentially consist of an anode and a cathode separated by a polymer membrane allowing ions to pass from the anode to the cathode.

Thus, the anode supplied with fuel, for example hydrogen, is the site of an oxidation half-reaction. At the same time, the cathode supplied with oxidant, for example pure oxygen or oxygen contained in air, is the site of a reduction half-reaction. In order for these two half-reactions to be possible, it is necessary to fill the anode and cathode with catalyst, namely a compound capable of increasing the reaction rate without itself being consumed. Among the various catalysts employed, it has been observed that the best performance is obtained using platinum, alone or in alloy form.

In order to prevent any degradation of the fuel-cell stack, and especially of the catalysts, during the many stops/starts undergone in the lifetime of a stack, it is necessary to provide specific stopping procedures, such as that described in patent application EP 2 494 642.

However, the performance of fuel-cell stacks has been observed to decrease after a few stop/start cycles. Therefore, the objective of the present invention is to provide a method allowing the performance of a fuel-cell stack to be maintained without disrupting its operation and without creating supplementary degradation.

BRIEF DESCRIPTION OF THE INVENTION

One object of the invention is to provide a method for stopping a polymer electrolyte membrane fuel-cell stack, the fuel-cell stack being installed in a system comprising a fuel-gas supply circuit connecting a fuel-gas tank to the anode of the fuel-cell stack, and an oxidant-gas supply circuit connected to an oxidant-gas tank, or to atmospheric air, the fuel gas being hydrogen, the method comprising the following steps:

(i) cutting off the supply of fuel gas and oxidant gas;

(ii) continuing to draw current until the oxidant gas is consumed; and (iii) injecting gas enriched with nitrogen into the oxidant-gas supply system, the method being characterized in that, at the end of the stopping procedure, the hydrogen still present at the anode of the fuel-cell stack is completely eliminated.

Hydrogen present at the anode ensures that the electrochemical potential remains at 0 V. This electrochemical potential therefore increases once the hydrogen has been eliminated. Now, if the electrochemical potential exceeds a certain preset threshold, chemical species absorbed by a catalyst of the fuel-cell stack during secondary reactions that take place during the operation of the stack are released. This desorption cleans the catalyst, increasing the active area thereof. The performance of the catalyst is therefore increased, thus allowing the performance of the fuel-cell stack to be increased.

It will be noted here that this elimination of the hydrogen must only be carried out after the fuel-cell stack has been completely shut down. Specifically, partial or complete absence of hydrogen during the stopping procedure leads to the following reactions:

corrosion at the anode of the carbon that supports the catalyst;

dissolution of platinum at the cathode;

irreversible decrease of catalytic activity; and inversion of the potential between the anode and cathode in the case of a fuel-cell stack composed of a plurality of cells.

Such reactions would be counter-productive, since they would decrease the performance of the fuel-cell stack, and thus cancel out all the benefit of the method according to the present invention. The stack is considered to be shut down once the residual voltage between the anode and the cathode becomes very low, for example lower than or equal to 0.06 volts. The final step of eliminating the hydrogen may be carried out either each time the stack is stopped, or less often.

In one advantageous embodiment of the invention, the step of eliminating the hydrogen comprises a mechanical suction step. This suction is, for example, achieved using a vacuum pump. For example, in a configuration such as described below with reference to the figures, operating the vacuum pump for two minutes allows 90% of the hydrogen still present at the anode after shutdown to be extracted.

In one advantageous embodiment of the invention, the step of eliminating the hydrogen comprises a blowing step, consisting in injecting, at the cathode, a positive pressure of nitrogen, intended to replace the hydrogen.

In one advantageous embodiment of the invention, the step of eliminating the hydrogen is carried out by consuming the hydrogen by means of a resistance installed across the terminals of the fuel-cell stack.

In one advantageous embodiment of the invention, the step of eliminating the hydrogen comprises an electrochemical pumping step, implementing an electrochemical membrane installed outside of the stack. Such an electrochemical membrane operates on the same principle as the cells forming the stack of the fuel-cell stack, and thus allows the hydrogen to be consumed via electrochemical reactions similar to those that take place during operation of the stack.

It will be noted that these various means of eliminating the hydrogen may be used alone or in combination with one another. Thus, in one advantageous embodiment, the resistance installed across the terminals of the fuel-cell stack is used to consume hydrogen residues remaining after application of another of the aforementioned means.

It will be noted that the use of the vacuum pump, for example, leads to a local penury of hydrogen in certain cells, while simultaneously leaving hydrogen behind in others. To remedy this, in one advantageous embodiment, a three-way valve is used to alternate a step in which a vacuum is created in the stack and a step in which the gases still present in the stack are mixed, in order to ensure that each vacuum step effectively allows hydrogen to be eliminated from all the cells.

After the hydrogen has been eliminated, ambient air is observed to penetrate into the stack, by natural permeation. This gradual ingress of air makes it possible to maintain the deviation in potential leading to the aforementioned performance recovery. It will be noted if the stack were completely seal-tight, it would be necessary to force the permeation in order to guarantee ingress of a minimum of air into the stack.

Moreover, another aspect of the invention relates to a method for starting up a polymer electrolyte membrane fuel-cell stack, including an initial step of suction of oxidant gas present at the anode before injecting the fuel gas. Specifically, when a stack is stopped by way of a stopping method according to the present invention, oxidant gas replaces hydrogen throughout the stack, including at the anode. Therefore, it is necessary to eliminate the oxidant gas before hydrogen is injected to start an operating cycle in order to avoid the copresence of oxidant gas and hydrogen on a given electrode, as otherwise in-plane voltages would be created that adversely affect the durability of the stack. It will be noted that this starting-up method may be implemented independently of the present invention.

Another aspect of the invention relates to a system containing a fuel-cell stack, said system comprising a gas circuit and a stack of electrochemical cells forming a fuel-cell stack comprising a polymer ion exchange membrane, said circuit comprising:

a fuel-gas supply circuit connecting a fuel-gas tank to the anode of the fuel-cell stack; and an oxidant-gas supply circuit connecting an oxidant-gas tank, or atmospheric air, to the cathode of the fuel-cell stack;

characterized in that the system furthermore comprises means able to completely eliminate the hydrogen present at the anode of the fuel-cell stack.

In one advantageous embodiment, the means able to completely eliminate the hydrogen comprise a vacuum pump installed in the fuel-gas supply circuit.

In one advantageous embodiment, the means able to completely eliminate the hydrogen comprise a resistance installed in parallel with the fuel-cell stack.

In one advantageous embodiment, the means able to completely eliminate the hydrogen comprise a polymer membrane installed outside of the stack.

BRIEF DESCRIPTION OF THE FIGURES

The rest of the description will allow all the aspects of the invention to be clearly understood by means of the appended drawings, in which.

DESCRIPTION OF PREFERRED
EMBODIMENTS OF THE INVENTION

Figure 1:
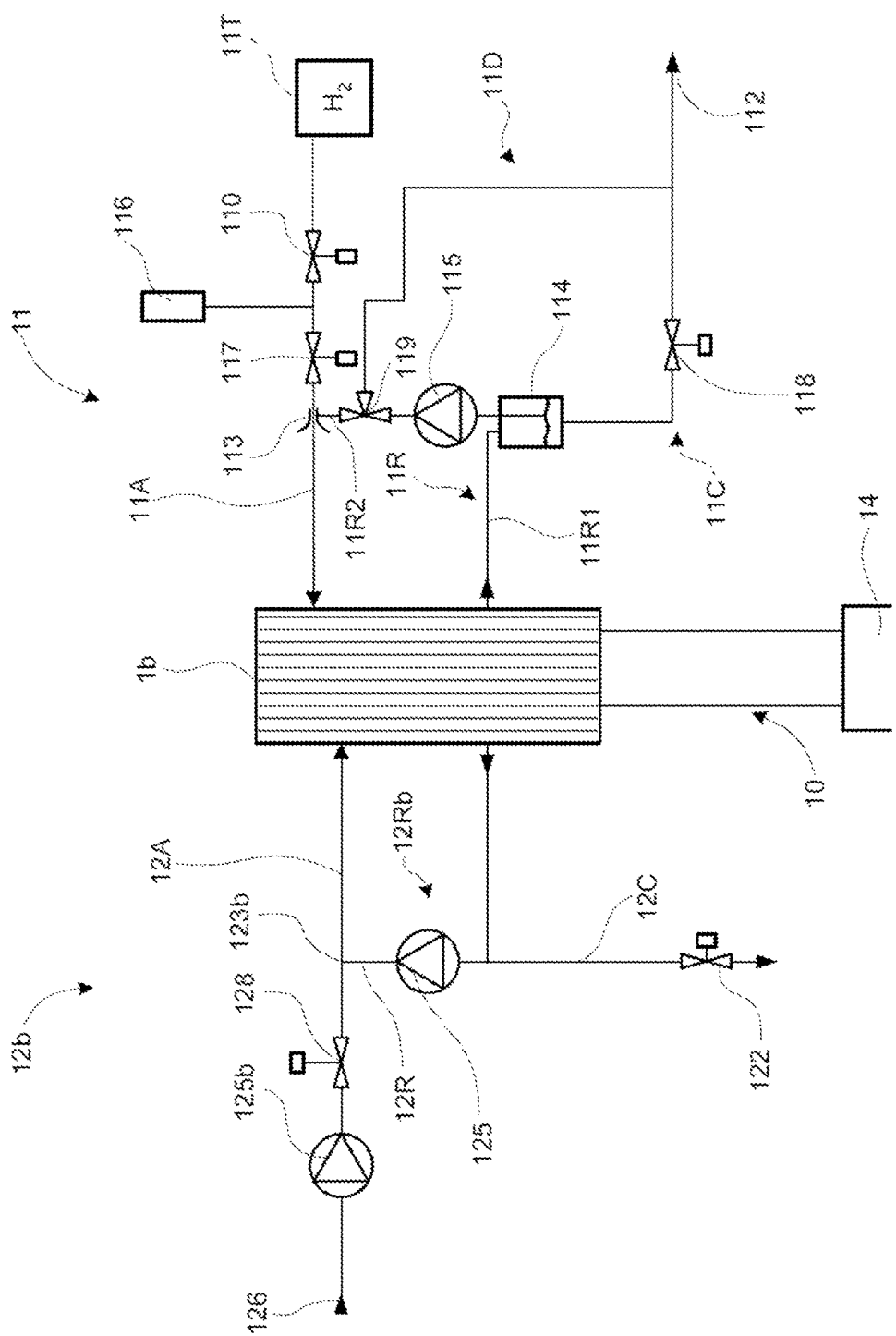
FIG. 1 is a schematic diagram of a fuel-cell stack according to an embodiment of the invention, supplied with hydrogen and air.

FIG. 1 shows a fuel-cell stack 1b in which the electrolyte takes the form of a polymer membrane (i.e. a PEFC (polymer electrolyte fuel cell) stack or a PEMFC (proton exchange membrane fuel cell) stack). The fuel-cell stack 1b is supplied with two gases, namely the fuel gas (hydrogen stored or produced on board the vehicle) and the oxidant gas (air or pure oxygen), which supply the electrodes of the electrochemical cells. An electrical load 14 is connected to the fuel-cell stack 1b by an electrical line 10. FIG. 1 shows elements of the cathode circuit that allow the invention to be better understood, although the subject of the present application essentially relates to the anode circuit of a fuel-cell stack.

Description of the Anode Circuit:

The installation includes an anode-side fuel-gas supply circuit 11. A tank 11T of pure hydrogen $H_2$ is shown connected to the inlet of the anode circuit of the fuel-cell stack 1b by means of a supply duct that passes through a cut-off valve 110, then through a pressure-regulating valve 117, then through an ejector 113, and then through a fuel-gas supply duct 11A leading to the anodes. A pressure probe (not shown) is installed in the supply duct 11A just before the inlet into the fuel-cell stack 1b. The hydrogen (fuel) supply circuit 11 also comprises a circuit 11R for recycling hydrogen not consumed by the fuel-cell stack, connected to the outlet of the anode circuit of the fuel-cell stack 1b. A water separator 114 is installed in the recycling circuit 11R. The ejector 113 and a circulating pump 115 ensure unconsumed hydrogen is recycled and mixed with fresh hydrogen coming from the tank.

An additional fuel-gas accumulation chamber 116 is also shown connected to the piping of the fuel-gas supply circuit 11 between the cut-off valve 110 and a pressure-regulating valve 117. The additional accumulation chamber is, in this preferred embodiment, placed where the pressure is highest in the supply circuit, so as to decrease the volume thereof, or, for a given volume, store a larger amount of hydrogen. It will be noted that the additional fuel-gas accumulation chamber 116 could be placed anywhere in the fuel-gas supply circuit, i.e. anywhere between the cut-off valve 110 and the fuel-cell stack 1b, and even in the recycling circuit 11R or in the circuit between the water separator 114 and the ejector 113. However, it is advantageous to place it in a location in the circuit where pressure is highest in order to decrease the volume thereof. Furthermore, the position upstream of the pressure-regulating valve makes it possible to controllably discharge said accumulation chamber.

A suction pump 119 and a cut-off valve 118 are also shown installed in a duct venting to atmosphere and connected to the fuel-gas recycling loop 11R, preferably under the water separator 114. Connection at this precise location, as shown in FIG. 1, makes it possible, by controlling the cut-off valve 118, to provide three functions: water removal, purging, and suction of the hydrogen. However, this embodiment detail is nonlimiting. To provide the hydrogen suction function, the duct including the cut-off valve 118 could be connected at any point downstream of the pressure-regulating valve 117.

The suction pump 119 and the cut-off valve 118 are able to be controlled so as to suck out the hydrogen, after the stack has been shut down, in order to obtain its complete elimination. In the same way, the load 14 corresponds to the aforementioned resistance. The other means provided by the present invention, such as the electrochemical membrane, are not shown in this figure.

Description of the Cathode Circuit:

The installation also includes a cathode-side oxidant-gas supply circuit 12b. This circuit includes an air compressor 125b serving in normal use to supply the fuel-cell stack with atmospheric air 126 by means of a supply duct that passes through a cut-off valve 128, then through an oxidant-gas supply duct 12A leading to the cathodes. It will be noted that the present invention is also applicable in the case of a fuel-cell stack supplied with pure oxygen. In this case, an oxygen tank would be provided in place of the air inlet 126.

Furthermore, the circuit 12 supplying the oxygen-containing air also comprises a circuit 12R for recycling oxygen not consumed by the fuel-cell stack, connected to the outlet of the cathode circuit of the fuel-cell stack 1*b*. The recycling circuit 12Rb is directly connected to the supply duct 12A by a bypass connection 123*b* downstream of the air compressor 125*b*. A pressure-regulating valve 122 allows, in normal operation, depleted air to be continuously exhausted to atmosphere. The degree of opening of this pressure-regulating valve 122 is controlled to maintain the pressure in the cathode circuit at the desired value.

In normal operation of the fuel-cell stack, the recycling circuit is not used, the pump 125 is stopped, and no gas flows through the recycling circuit 12Rb which to all intents and purposes can be considered to be absent. All the gas not consumed by the cathode circuit is directed to atmosphere through the pressure-regulating valve 122*b*. In the case where the pump 125 does not naturally provide the anti-return function when stopped, it is necessary to provide an anti-return valve in the recycling circuit 12Rb so as to guarantee that all the air provided by the compressor passes toward the cathode circuit of the fuel-cell stack 1*b*.

The cut-off valve 128 allows the cathode circuit to be isolated from atmospheric air when the stack is stopped. This cut-off valve 128 may either be placed upstream or downstream of the compressor.

Figure 2:
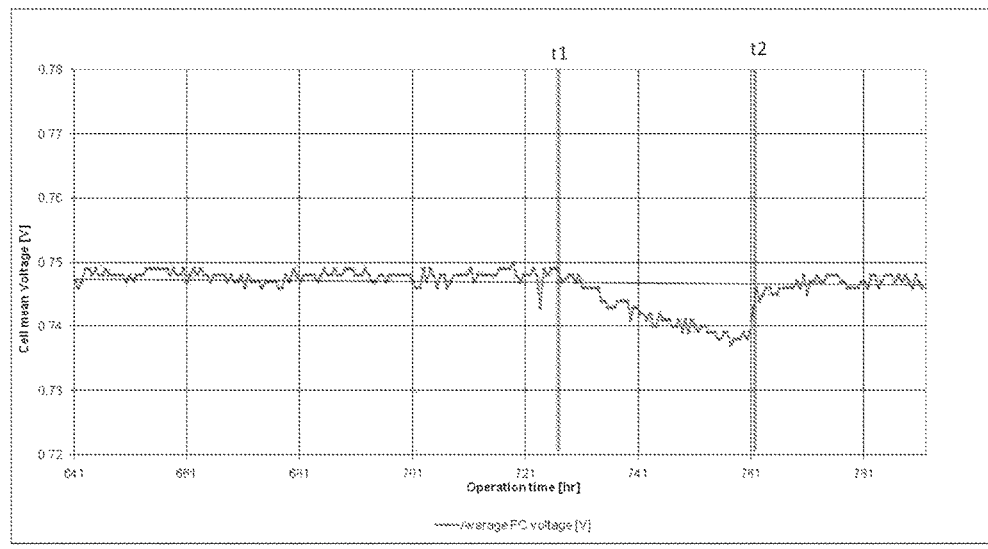
FIG. 2 shows the performance over time of a fuel-cell stack implementing the invention.

FIG. 2 shows the performance of a fuel-cell stack of 16 cells implementing the invention. Each point of the curve was recorded once temperature and current had reached their nominal values (70° C.-100 A), and represents the mean voltage of the cells after each start-up of the stack. In this exemplary implementation, the stack was subjected to repeated stop/start cycles of about 1 hour.

The x-axis shows the number of hours of cumulative operation of the fuel-cell stack, and the y-axis shows the mean voltage of the cells. From the time t0, corresponding to the start of the curve, to the time t1 represented by a first vertical line, the hydrogen-eliminating step was carried out after each shutdown of the stack. It may thus be seen that the performance of the stack did not degrade, since the mean voltage of the cells remained almost constant throughout the repeated cycling of the fuel-cell stack.

In contrast, from the time t1, this hydrogen-eliminating step was no longer carried out. The fuel-cell stack was therefore stored with hydrogen at the anode and nitrogen at the cathode. It may be seen that the performance of the stack rapidly degraded, since the mean voltage across the terminals of the cells passed from 0.75 to 0.74 V.

From the time t2, marked by the second vertical line, the step consisting in eliminating the hydrogen was once more carried out. A rapid and durable recovery in performance was observed.

Therefore, the present invention allows the performance of a fuel-cell stack to be effectively maintained without degradation of the stack.

The invention claimed is:

1. A method for stopping a polymer electrolyte membrane fuel-cell stack, the fuel-cell stack comprising a stack of cells and being installed in a system comprising a fuel-gas supply circuit connecting a fuel-gas tank to the anode of the fuel-cell stack, and an oxidant-gas supply circuit connected to an oxidant-gas tank, or to atmospheric air, the method comprising a procedure for shutting down the fuel-cell stack comprising the following steps:
   (i) cutting off the supply of fuel gas and oxidant gas;
   (ii) continuing to draw current until the oxidant gas is sufficiently consumed; and
   (iii) injecting gas enriched with nitrogen into the oxidant-gas supply system,
   wherein the method further comprises the step of completely eliminating the hydrogen still present at the anode of the stack, and
   wherein the step of eliminating the hydrogen comprises an electrochemical pumping step, implementing an electrochemical membrane installed outside of the stack.

2. A method for starting up a polymer electrolyte membrane fuel-cell stack having undergone a stopping procedure according to claim 1, the starting-up method including an initial step of suction of oxidant gas present at the anode before injecting the fuel gas.

3. A system containing a fuel-cell stack, said system comprising a gas circuit and a stack of electrochemical cells forming a fuel-cell stack comprising a polymer ion exchange membrane, said circuit comprising:
   a fuel-gas supply circuit connecting a fuel-gas tank to the anode of the fuel-cell stack; and
   an oxidant-gas supply circuit connecting an oxidant-gas tank, or atmospheric air, to the cathode of the fuel-cell stack;
   wherein the system furthermore comprises means able to completely eliminate the hydrogen present at the anode of the fuel-cell stack, and
   wherein the means able to completely eliminate the hydrogen comprise a resistance installed in parallel with the fuel-cell stack.

4. The system according to claim 3, wherein the means able to completely eliminate the hydrogen comprise a polymer membrane installed outside of the stack.

* * * * *